United States Patent
Rickert

[11] 3,731,808
[45] May 8, 1973

[54] FILTER APPARATUS

[76] Inventor: Sherwood A. Rickert, 2559 North Monitor Avenue, Chicago, Ill. 60639

[22] Filed: Apr. 7, 1971

[21] Appl. No.: 131,932

[52] U.S. Cl. ............................... 210/138, 210/387
[51] Int. Cl. ................................................ B01d 33/00
[58] Field of Search ...................... 210/138, 297, 344, 210/387, 398, 410, 401, 499, 507

[56] References Cited

UNITED STATES PATENTS

| | | | |
|---|---|---|---|
| 2,867,324 | 1/1959 | Hirs | 210/387 X |
| 3,333,693 | 8/1967 | Hirs | 210/387 X |
| 3,443,695 | 5/1969 | O'Neill | 210/387 X |
| 2,867,327 | 1/1959 | Hirs | 210/138 X |
| 3,335,862 | 8/1967 | Hirs | 210/387 X |
| 2,969,148 | 1/1961 | Hirs | 210/138 X |

*Primary Examiner*—Samih N. Zaharna
*Assistant Examiner*—T. A. Granger
*Attorney*—Charles B. Cannon

[57] ABSTRACT

A filter apparatus for filtering solutions of various kinds and for various purposes including metal and like plating solutions including a filter housing having a web inlet opening and a web outlet opening through which a web of filter sheet material is drawn into the filter housing and the used sections thereof removed at intervals from the filter housing. Combination closure, sealing and web-clamping means or units are provided for cyclically opening and closing, sealing and clamping the web of filter sheet material in the web inlet and the web outlet openings of the filter housing. Means including an air pressure system embodying air-operated valves are provided for cyclically operating the combination closure, sealing and web-clamping means or units for the web inlet and web outlet openings of the filter housing.

The filter apparatus also includes means for cyclically pumping the filter solution into the filter housing and for removing the filtrate therefrom. The air pressure system includes air-operated valves for opening and closing the filter solution inlet in the filter housing and the filtrate outlet therefrom, and air pressure-responsive regulator switch means and an electronic timing switch means are provided for cyclically controlling the operation of the air valves for the web inlet and the web outlet openings in the filter housing and for cyclically controlling the operation of the air valves for the filter solution inlet and the filtrate outlet in the filter housing, and for other purposes.

A web of filter sheet material is provided having longitudinally spaced fluid-resistant areas or sections, which are resistant to filter solutions, for sealing the web inlet and web outlet openings in the filter housing during the filtering operation.

Means are provided for cyclically advancing the web of filter sheet material into and through the filter housing.

The apparatus also includes means for cyclically withdrawing unused filter solution from the filter housing at the end of each cycle of operations thereof and for withdrawing excess of filter solution from the web of filter sheet material at the end of each filtering operation and prior to the time when the used section of filter material is withdrawn from the filter housing and cut from the web of filter sheet material.

6 Claims, 14 Drawing Figures

Patented May 8, 1973  3,731,808

INVENTOR.
SHERWOOD A. RICKERT

BY Charles D. Cannon
HIS ATTY

Patented May 8, 1973

INVENTOR.
SHERWOOD A. RICKERT

BY Charles D. Cannon

HIS ATTY

Patented May 8, 1973

INVENTOR
SHERWOOD A. RICKERT

BY Charles B. Cannon

HIS ATTY

FILTER APPARATUS

OBJECTS

An object of the invention is to provide a new and improved filter apparatus for use in filtering various solutions including those used in plating metal parts or components such, for example, as filter solutions used in chromium plating, nickel plating, silver plating, and the like.

Another object of the invention is to provide a new and improved filter apparatus embodying novel combination closure, sealing and web-clamping means for cyclically opening, closing and sealing the web inlet and web outlet openings in the filter housing through which the web of filter sheet material is drawn into and is withdrawn from the filter housing and for clamping the web of filter sheet material in the web inlet and web outlet openings during the time the filter apparatus is in operation.

An additional object of the invention is to provide a new and improved filter apparatus embodying novel means for cyclically advancing a web of filter sheet material into and through the filter housing.

A further object of the invention is to provide a filter apparatus embodying a new and improved filter sheet material for effectively sealing the web inlet and web outlet openings in the filter housing through which the web of filter sheet material is fed into and is withdrawn from the filter housing.

An additional object of the invention is to provide a new and improved filter apparatus embodying novel means for cyclically controlling the flow of the filter solution into and the discharge of the filtered solution or filtrate from the filter housing.

A further object of the invention is to provide a filter apparatus embodying novel means for removing excess of filter solution from the filter housing at the end of each filtering operation and prior to the time the used section of the web of filter sheet material is withdrawn from the filter housing.

Still another object of the invention is to provide a new and improved portable filter apparatus embodying a novel combination and arrangement of means for cyclically controlling the various operations of the new filter apparatus in timed relationship with each other.

Other objects will appeal hereinafter.

DETAILED DESCRIPTION OF STRUCTURE

A preferred and typical embodiment of the new filter apparatus is illustrated in the drawings, wherein it is generally indicated at 15, and comprises a wheel-bearing supporting frame 16 which includes upright supporting frame members 17 on which an elongated filter housing 18 is mounted. The filter housing 18 is adapted to receive and to hold various solutions which it may be desired to filter including, for example, plating solutions for plating metal parts or components such as, for example, those used in chromium plating, nickel plating, silver plating, and the like.

Figures 9, 10, 11:
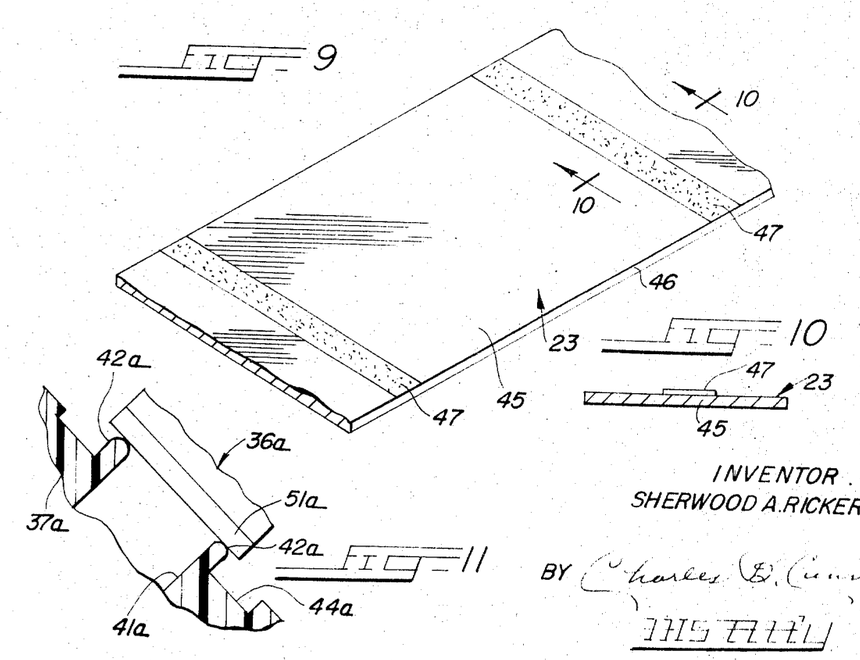
FIG. 9 is a fragmentary perspective view of a portion of a web of the new filter sheet material embodied in the invention.
FIG. 10 is an enlarged fragmentary sectional view of the filter sheet material, on line 10—10 in FIG. 9.
FIG. 11 is an enlarged fragmentary sectional view of part of one of the combination closure, sealing and web-clamping units embodied in the invention.

An upright auxiliary web supporting frame unit 21 is provided on and at one end portion of the main supporting frame 16 and a web roll in the form of a web of filter sheet material 23 is rotatably mounted or cradled, as at 24, on the auxiliary roll supporting frame 21. While the web 23 of filter sheet material may be of any suitable type such, for example, as paper, nylon, polypropylene resin, or other porous and woven flexible filter sheet material, which may be used in filtering various solutions including metal plating solutions, and the like, a preferred form and embodiment of such filter sheet material 23 is illustrated in FIGS. 9 and 10 of the drawings, and will be described more fully hereinafter.

Figure 2:
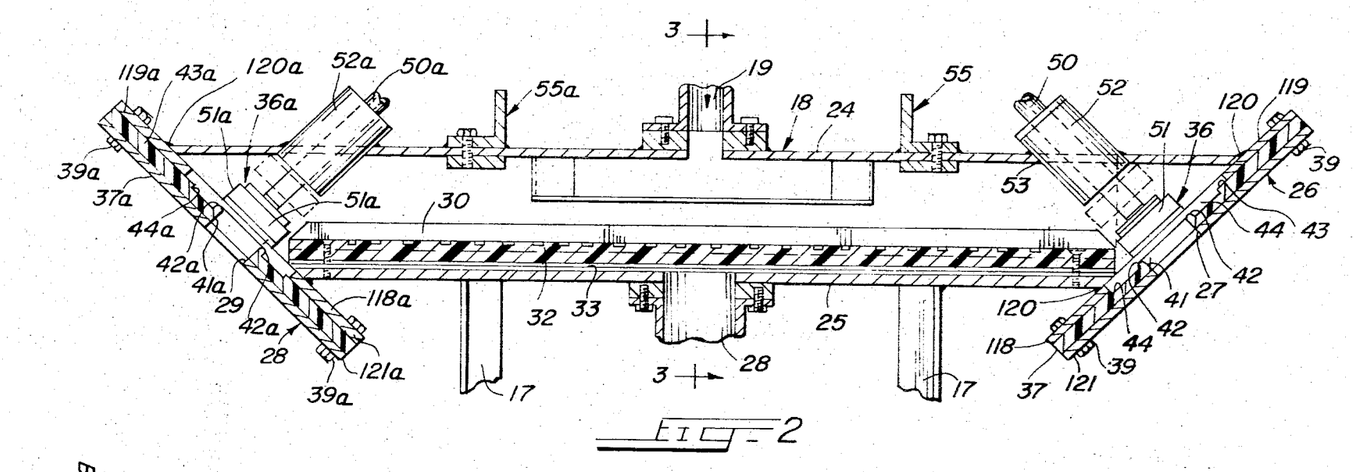
FIG. 2 is a fragmentary longitudinal central vertical sectional view of the filter housing embodied in the new filter apparatus and showing the web inlet and web outlet openings through which the web of filter sheet material is cyclically fed into and is withdrawn from the filter housing, and also showing the combination closure, sealing and web-clamping means or units for closing and sealing the web inlet and web outlet openings in the filter housing and for clamping the web of filter sheet material therein.
Figure 3:
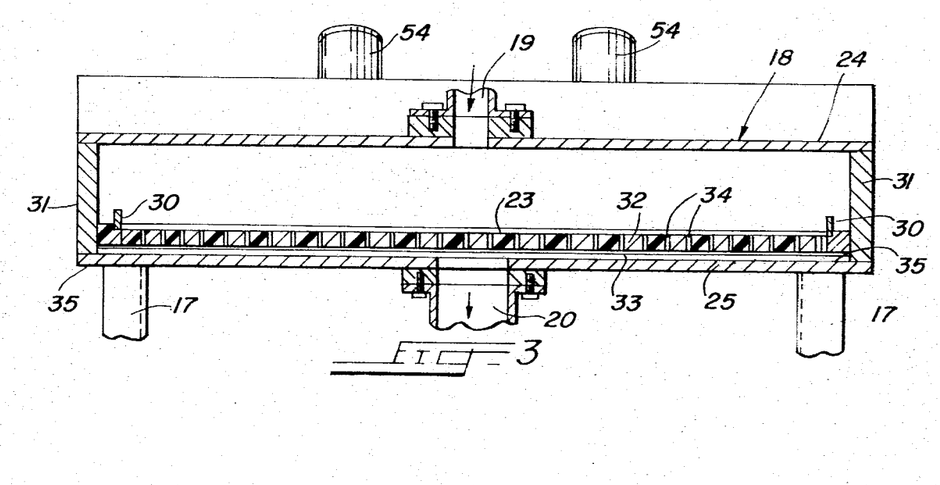
FIG. 3 is a fragmentary transverse central vertical sectional view on line 3—3 in FIG. 2.
Figure 4:
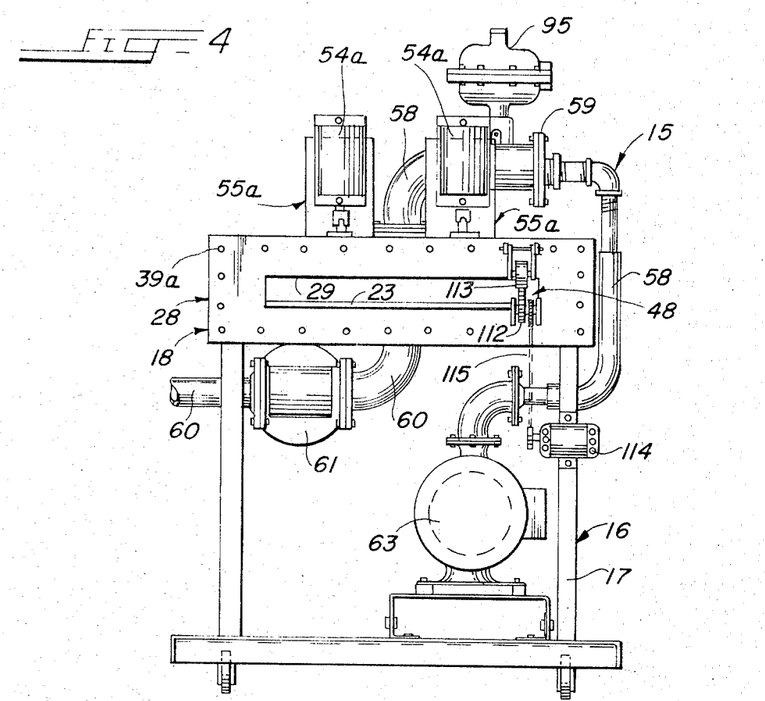
FIG. 4 is an end elevational view of the new filter apparatus as seen from the web outlet end thereof.
Figure 6:
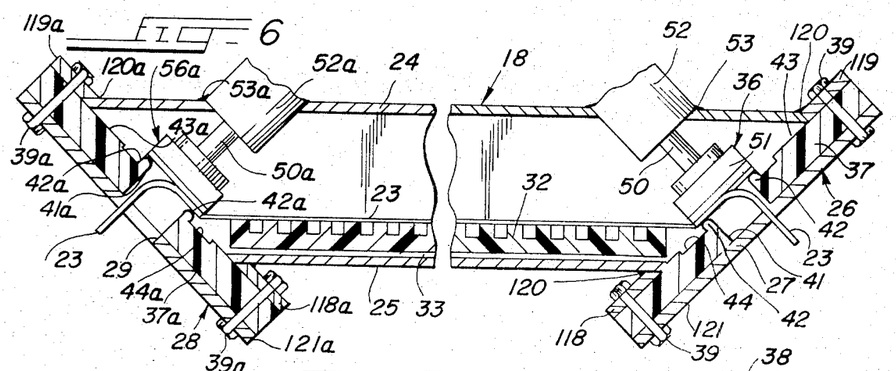
FIG. 6 is a fragmentary central longitudinal vertical sectional view showing part of the filter housing and showing parts of the combination closure, sealing and web-clamping means arranged at the web inlet and web outlet openings of the filter housing.
Figures 7, 8:
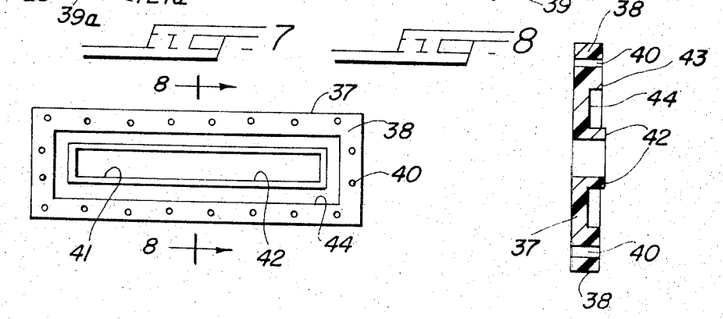
FIG. 7 is an elevational view showing one of the stationary combination closure, sealing and web-clamping plate members embodied in the invention.
FIG. 8 is an enlarged transverse sectional view on line 8—8 in FIG. 7.

The filter housing 18 may be made of any suitable corrosion-resistant metal such, for example, as chromium steel, and includes a top wall 24 in which a solution inlet 19 is formed; a bottom wall 25 in which a filtrate outlet 20 is formed (FIGS. 2 and 3); side walls 31; an inclined end wall generally indicated at 26, and having a main web inlet 27 provided therein for the introduction of the filter sheet web 23 into the filter housing 18 (FIGS. 2 and 6); and an inclined end wall, generally indicated at 28, and having a main web outlet 29 provided therein for the cyclical withdrawal of the used sections of the web of filter sheet material 23 from the filter housing 18 after each filtering operation (FIGS. 2, 4 and 6).

As best shown in FIG. 3, a pair of web guides 30 for the filter sheet material 23 are arranged in the filter housing 18, inwardly of the side walls 31, and the web 23 of filter sheet material travels between the web guides 30 and above a perforated generally rectangular-shaped filter plate member 32 which may be made of any suitable material, such, for example, as metal, plastic resinous material, or the like, and is generally coextensive in area with the bottom wall 25 of the filter housing 18 but is spaced slightly above the latter to provide a flow channel 33 for the flow of the filtrate into the filtrate outlet opening 20 in the filter housing 18 (FIG. 2).

As also shown in FIG. 2, the filter plate member 32 is provided with a multiplicity of perforations 34, which open at their lower ends into the filtrate flow channel 33 and are closed at their upper ends by the web 23 of filter sheet material.

As is also shown in FIG. 2, the perforated filter plate member 32–34 is held in spaced relationship above the bottom wall 25 of the filter housing 18, and above the filtrate flow channel 33, by means of suitable supporting members 35 which are arranged on the inner surface of the bottom wall 25 of the filter housing 18 adjacent the side walls 31 thereof.

A combination closure, sealing and web-clamping means or unit, generally indicated at 36, is mounted adjacent to and in association with the main web inlet opening 27 in the end wall 26 of the filter housing 18, and a similar combination closure, sealing and web-clamping means or unit 36a is mounted adjacent to and in association with the main web outlet opening 29 for the web of sheet material 23 in the end wall 28 of the filter housing 18 (FIGS. 2, 6 and 11). Since these two combination closure, sealing and web-clamping means or units 36 and 36a are identical in construction, only one of them (the combination closure, sealing and web-clamping means or unit 36 for the main web inlet 27) will be described in detail and those parts in the other combination closure, sealing and web-clamping means or unit 36a, which is associated with the main web outlet opening 29 in the filter housing 18 which correspond to parts in the combination closure, sealing and web-clamping means or unit 36, have been given the same reference numerals followed by the additional and distinguishing reference character a.

Thus, by reference to FIGS. 2 and 6, it will be noted that the end wall 26 of the filter housing 18 is formed, in part, by inclined flanges 118 and 119 which are attached, in any suitable manner, as by welding 120, to the top and bottom walls 24 and 25, respectively, of the filter housing 18. The end wall 26 also includes an outer and generally rectangular-shaped plate member 121, in which the main web inlet opening 27 is formed, and the end wall 26 is completed by an intermediate rectangular-shaped resilient plate member 27, which will be described more fully hereinafter.

As shown in FIGS. 2 and 6, the resilient plate member 37 is held in position between the end flanges 118 and 119 and the outer end plate 121 by suitable fastening means, such as bolts 39, to complete the structure of the end wall 26, and the opposite end wall 28 is similarly formed by parts which have been given the same reference numerals followed by the additional and distinguishing reference character a.

By reference to FIGS. 2 and 6 it will be noted that the combination closure, sealing and web-clamping means or unit 36 includes the generally rectangular-shaped resilient end wall and sealing plate member 37 and which, as described above, forms a component part of the end wall 26 of the filter housing 18 and is held in fluid-tight sealing engagement with the inclined flanges 118 and 119 and with the end wall plate member 121 by means of the fastening bolts 39, which extend through suitable openings in the end flanges 118 and 119 and in the end plate member 121 of the wall 26 of the filter housing 18 and through suitable openings 40 in the marginal edge portion 38 of the generally rectangular-shaped sealing plate member 37 (FIGS. 2, 6, 7 and 8).

As shown in FIGS. 2, 6, 7 and 8, the generally rectangular-shaped closure, sealing and web-clamping plate member 37 has a centrally arranged and generally rectangular-shaped opening 41 therein and this centrally arranged opening 41 is defined by resilient marginal edge sealing portions or ribs 42 which project slightly outwardly beyond the inner fact or surface 43 of the body of the sealing plate member 37 (FIG. 8), for a reason which will be explained hereinafter.

As pointed out above, the sealing plate member 37 is resilient and is preferably made of flexible and resilient and fluid-resistant material such, for example, as natural latex rubber, or various flexible, resilient synthetic elastomeric copolymer resinous materials, such as butadiene-acrylonitrile or butadiene-styrene copolymers, and the like, and has a generally rectangular-shaped recess 44 therein surrounding the marginal edge sealing portions or ribs 42, for a reason which will be explained hereinafter.

As shown in FIGS. 9 and 10, the preferred form of the web of filter sheet material 23 includes an elongated body or sheet 45 of suitable filter material such, for example, as paper, nylon, polypropylene, or other suitable filter material, having parallel marginal edges 46, and having transversely extending and generally rectangular-shaped coated sealing areas or sections 47 which extend transversely between the marginal edges 46 of the body 45 of the web 23 of filter sheet material (FIGS. 9 and 10). These coated sealing areas or sections 47 may be coated with any suitable water-resistant and fluid-resistant material such, for example, as natural latex rubber, various synthetic copolymer elastomers, as described above, tar, asphalt, and the like, and the coated sealing areas or sections 47 are spaced longitudinally from each other on the body 45 of the web 23, at their centers, a lineal distance approximately equal to the longitudinal spacing of the centers of the lower outwardly projecting sealing portions or ribs 42 and 42a in the flexible, resilient stationary, combination closure, sealing and web-clamping plate members 37–37a, for a reason which will be explained hereinafter.

Figure 1:
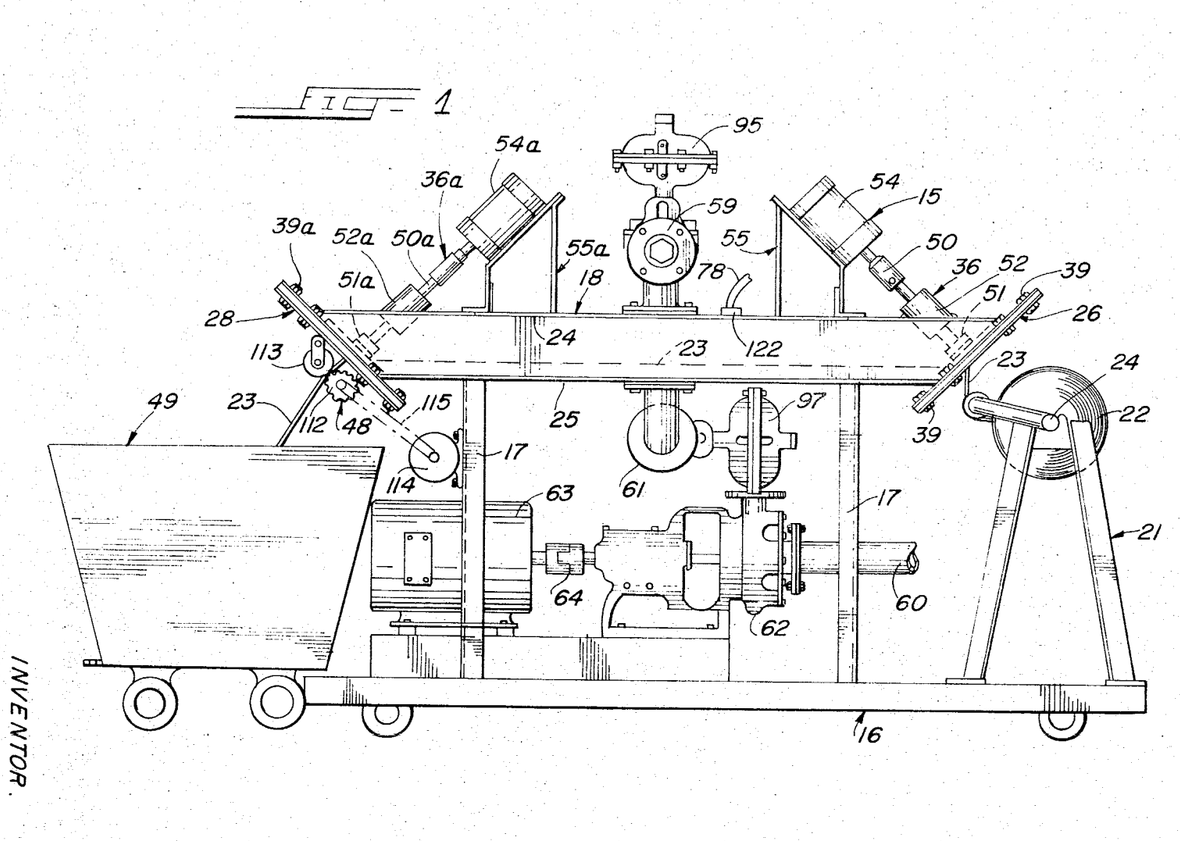
FIG. 1 is a side elevational view of a filter apparatus embodying the invention.

As shown in FIGS. 1 and 4, the new filter apparatus 15 embodies a web-advancing mechanism, generally indicated at 48, of conventional design and construction and which is arranged adjacent the end wall 28 and the web outlet 29 therein through which the used or waste filter sheet material 23 is withdrawn from the filter housing 18. The web-advancing mechanism 48 includes a web-gripping and advancing member or sprocket gear 112, suitably rotatably mounted on the supporting frame 16, an idler roller 113 associated therewith, an electric operating motor 114 suitably mounted on the supporting frame 16, and a power transmission unit 115 between the operating motor unit 114 and the web-gripping and advancing member 112 (FIGS. 1 and 4).

A wheel-bearing waste receptacle 49 is provided for the reception of the used or waste sections of the filter sheet material which may be manually or otherwise cut from the web 23, outwardly of the web outlet opening 29, and dropped into the wheel-bearing receptacle 49 at intervals during the operation of the filter apparatus 15.

The combination closure, sealing and web-clamping means or unit 36 includes the stationary closure, sealing and web-clamping means in the form of the flexible, resilient closure, sealing and web-clamping plate member 37 and movable closure, sealing and web-clamping means in the form of a pair of laterally spaced air-operated pistons 50, each having a sealing and web-clamping piston head 51 at its lower end. Each of the closure, sealing and web-clamping piston heads 51 is adapted to engage the outwardly projecting sealing portions or ribs 42 on the flexible, resilient closure, sealing and web-clamping plate member 37 so as to close and seal the web inlet opening 41 in the flexible, resilient sealing plate member 37, while, at the same time, clamping the web 23 of filter sheet material between the piston heads 51 and the flexible, resilient ribs 42 when the pistons 50 and their closure, sealing and web-clamping piston heads 51 are in lowered and effective or closing and sealing and web-clamping position, as in FIGS. 1, 2 and 6.

Each of the pistons 50 is slidably guided in a guide cylinder 52 which is mounted in an opening 53 in the top wall 24 of the filter housing 18 and the openings 53 for the guide cylinders 52 are provided with an air tight seal about their marginal edges, in any suitable manner, as by welding, or the like.

As shown in FIGS. 1, 2 and 6, the pistons 50 and attached piston heads 51 and the guide cylinders 52 are arranged or mounted at an acute angle relative to the horizontal and approximately perpendicular to the planes of the end walls 26 and 28 of the filter housing 18 and the flexible, resilient sealing plate members 37 and 37a, so that when the sealing and web-clamping heads 51 on the pistons 50 are disposed in lowered and effective or closure, sealing and web-clamping position, they extend parallel to and are in co-planar relationship with the stationary flexible, resilient closure, sealing and web-clamping plate members 37 and 37a. The upper end portion of each of the pistons 50 projects into and is slidably guided in an air cylinder 54 or 54a which are mounted on suitable supporting bracket units 55 and 55a which are mounted on the top wall 24 of the filter housing 18 and at an acute angle relative thereto, as shown in FIG. 1.

Figure 12:
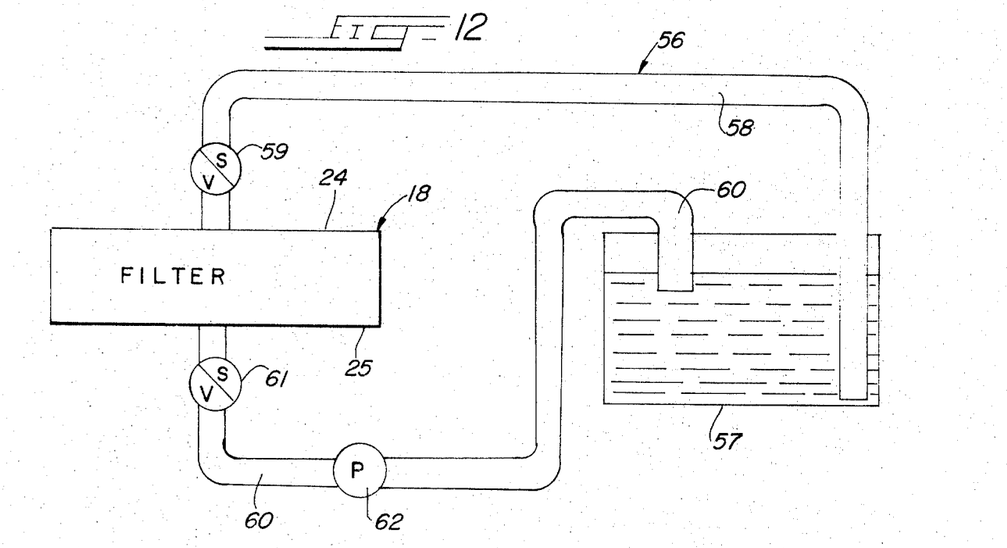
FIG. 12 is a schematic view or flow diagram showing the flow path of the filter solution into, through and from the filter housing.

As shown in FIG. 12, the new filter apparatus 15 includes means, generally indicated at 56, for circulating the filter solution into and through the filter housing 18, and this means includes a reservoir or storage tank 57 for the filter solution, and which may be suitably mounted on the supporting frame 16. As shown in FIG. 12, a supply line or pipe 58 leads from the lower area of the filter solution reservoir or tank 57 to the filter solution inlet opening 19 in the top wall 24 of the filter housing 18, and an electrically operated control valve 59 of conventional design and construction is interposed in the filter supply line 58 above the top wall 24 of the filter housing 18 (FIGS. 1, 4 and 12). A filtrate exhaust or outlet pipe or line 60 leads from the filtrate outlet opening 20 in the bottom wall 25 of the filter housing 18 to the upper area of the filter solution tank or reservoir 57, and an electrical control valve 61 of conventional design and construction is interposed in the filtrate outlet line 60 below the bottom wall 25 of the filter housing 18 (FIGS. 1, 4 and 12).

A motor-driven hydraulic pump 62, of known design and construction, is interposed in the filtrate outlet line 60 and is preferably of a type which, in operation, will withdraw the filter solution from the reservoir or tank 57, by way of the filter solution inlet line 58 and the valve 59 to the inlet opening 19 in the top wall 24 of the filter housing 18; into the filter housing 18 and through the web of filter sheet material 23 therein; through the perforated filter plate member 32–34; through the filtrate flow channel space 33 into the filtrate outlet opening 20 in the bottom wall 25 of the filter housing 18, into the filtrate outlet line 60, through the hydraulic pump 61, and thence by way of the filtrate outlet line 60 to the filter solution tank or reservoir 57. A suitable electric operating motor 63 for the hydraulic pump 62 is mounted on the supporting frame 16, below the filter housing 18, and the electric operating motor 63 is operatively connected to the hydraulic pump 62 by means of a suitable power transmission unit 64 (FIG. 1).

The new filtering apparatus 15 embodies a compressed air system or circuit for supplying air under pressure to the air cylinders 54–54 and 54a–54a, for operating the pistons 50–50 and 50a–50a and the combination closure, sealing and web-clamping piston heads 51–51 and 51a–51a carried thereby, and for other purposes, as will be described hereinafter. This compressed air system or circuit is shown diagrammatically in FIG. 13, wherein it is generally indicated at 65, and comprises an air compressor 66, of known design and suitable capacity, and an air pressure-responsive regulating switch unit 84, which will be referred to hereinafter. An air line 85 leads from the outlet side of the air compressor 66 to the air inlet side of the air pressure-responsive switch unit 84 and an air line 67–68 (all air lines being preferably in the form of flexible fluid-resistant tubing), leads from the outlet side of the air pressure-responsive switch unit 84 to the upper portion of one of the air cylinders 52a, and a branch air line 69–70 leads from the air line 68 to the upper area of the other air cylinder 52a, and similar branch air lines 69–71 and 69–71 lead from the air line 68 to the upper areas of the air cylinders 52—52. An air exhaust or return line 73 leads into the air responsive switch unit 84 and branch air lines 74—74 and 75—75 lead from the lower areas of the air cylinders 52—52 and 52a—52 to the air exhaust or return line 73.

Figure 13:
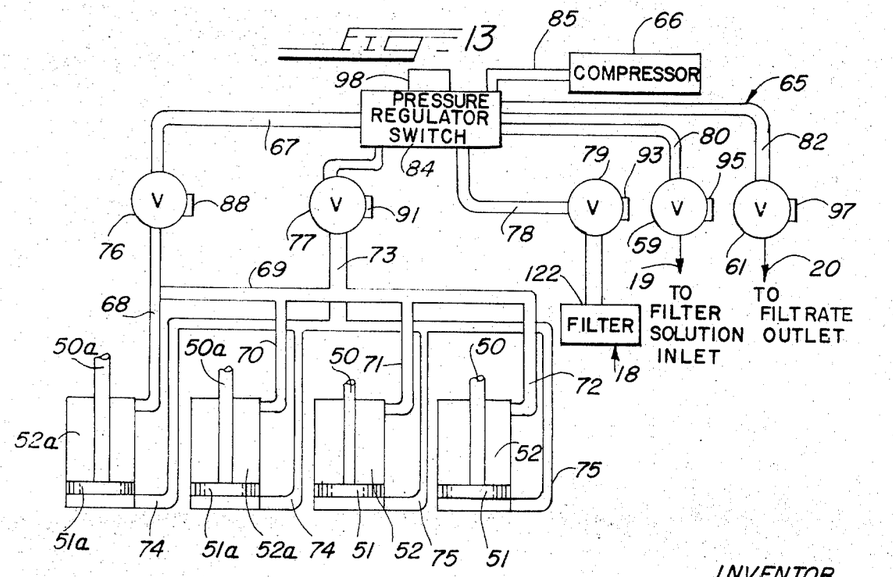
FIG. 13 is a schematic view showing the compressed air operating circuit embodied in the invention, the arrangement of the control valves embodied therein, and the arrangement of the electrical control operating solenoids for the control valves.

A solenoid-operated control valve 76 of conventional design is interposed in the air supply line 67 and a similar solenoid-operated control valve 77 is arranged in the air exhaust or return line 73.

As shown in FIGS. 1 and 13, an air line 78 leads from the air pressure-responsive regulator switch unit 84 to an air inlet 122 which is provided in the top wall 24 of the filter housing 18, and a suitable solenoid-operated control valve 79 is arranged in the air line 78. An air line 80 leads from the air pressure-responsive switch unit 84 to the filter solution inlet 19 of the filter housing 18 and a suitable solenoid-operated control valve 81 is arranged in the air line 80.

Similarly, an air line 82 leads from the air pressure responsive regulator switch unit 84 to the filtrate outlet 20 from the filter housing 18 and a suitable solenoid-operated control valve 83 is arranged in the air line 82 (FIG. 13).

The air pressure-responsive regulator switch unit 84 is of known design and construction and a suitable form thereof is a Mercoid air pressure-responsive regulating switch unit, Model DA 31-3, made by the Mercoid Corporation, Chicago, Ill., and which may be adjusted to operate at any desired air pressure up to 60 pounds per square inch.

A typical and preferred form of the hydraulic pump 62 is one having a capacity of 6,000 gallons per hour, and for such a pump an electric motor of 3 H.P. is satisfactory. However, it will be understood that the capacity of the hydraulic pump 62 and of the electric operating motor 63 therefor may be varied, within the scope and contemplation of the present invention depending, in part, on the desired capacity of the filter housing 18, the specific nature of the web 23 of filter sheet material employed, the nature of the filter solution to be filtered, and other variable factors.

Figure 5:
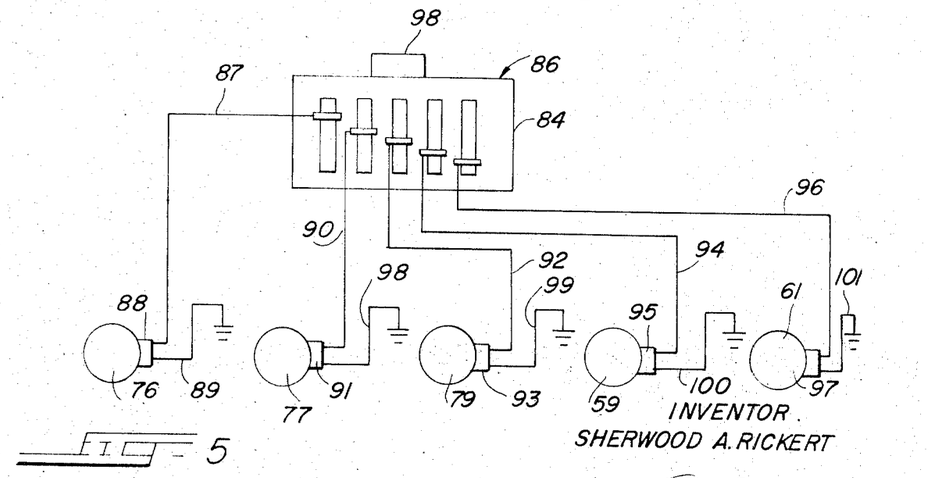
FIG. 5 is a schematic or diagrammatic view illustrating the electrical circuit embodied in the new filter apparatus for controlling in timed relationship the operation of the electrical control valves for operating the movable parts of the combination closure, sealing and web-clamping means, and for controlling in timed relationship the operation of the electrical control valves for the filter solution inlet and for the filtrate outlet openings in the filter housing.

A typical electrical operating circuit for the solenoid-operated control valves embodied in the new filter apparatus 15 is shown schematically in FIG. 5, and partly in FIG. 13, and comprises a timing switch unit 98 which is operatively and electrically connected to the air pressure responsive regulator switch unit 84, in a known manner. The timing switch unit 98 is of conventional and known design and construction but a typical and preferred form thereof for use with the air pressure-responsive switch unit 84 is a timing switch unit made by the E. W. Bliss Co. and known as the Bliss Eagle Signal Unit.

An electrical conductor 87 leads from the air pressure-responsive regulator switch unit 84 to an electrically controlled valve-operating solenoid unit 88 which is operatively connected to the control valve 76 which controls the supply of air under pressure, by way of the air lines 68–69–70–71–72 to the air cylinders 50a—50a –52—52 for the pistons 50a—50a-50—50 which operate the combination closure, sealing and web-clamping piston heads 51a—51a-51—51 (FIGS. 5 and 13).

An electrical conductor 90 leads from the air pressure-responsive regulator switch unit 84 to an electrically controlled valve-operating solenoid 91 for the air valve 77 which is arranged in the air exhaust or return line 74—74-75—75-73 from the air cylinders 52a- —52a-52—52 to the air pressure-responsive switch unit 84 (FIG. 13).

An electrical conductor 92 leads from the air pressure-responsive regulator switch unit 84 to a valve-operating solenoid 93 for the control valve 79 which controls the air intake into the filter opening 19 in the top wall 24 of the filter housing 18, as will be explained hereinafter. An electrical conductor 94 leads from the air pressure-responsive regulator switch unit 84 to an electrically controlled valve-operating solenoid unit 95 for the control valve 59 for the filter solution inlet 19 in the filter housing 18, and an electrical conductor 96 leads from the air pressure-responsive regulator switch unit 84 to a solenoid operating unit 97 for the control valve 61 for the filtrate outlet opening 20 in the filter housing 18; the valve-operating solenoid units 88–91–9 3–95 and 97 being suitably grounded as at 89, 98, 99, 100 and 101, respectively (FIG. 5).

Figure 14:
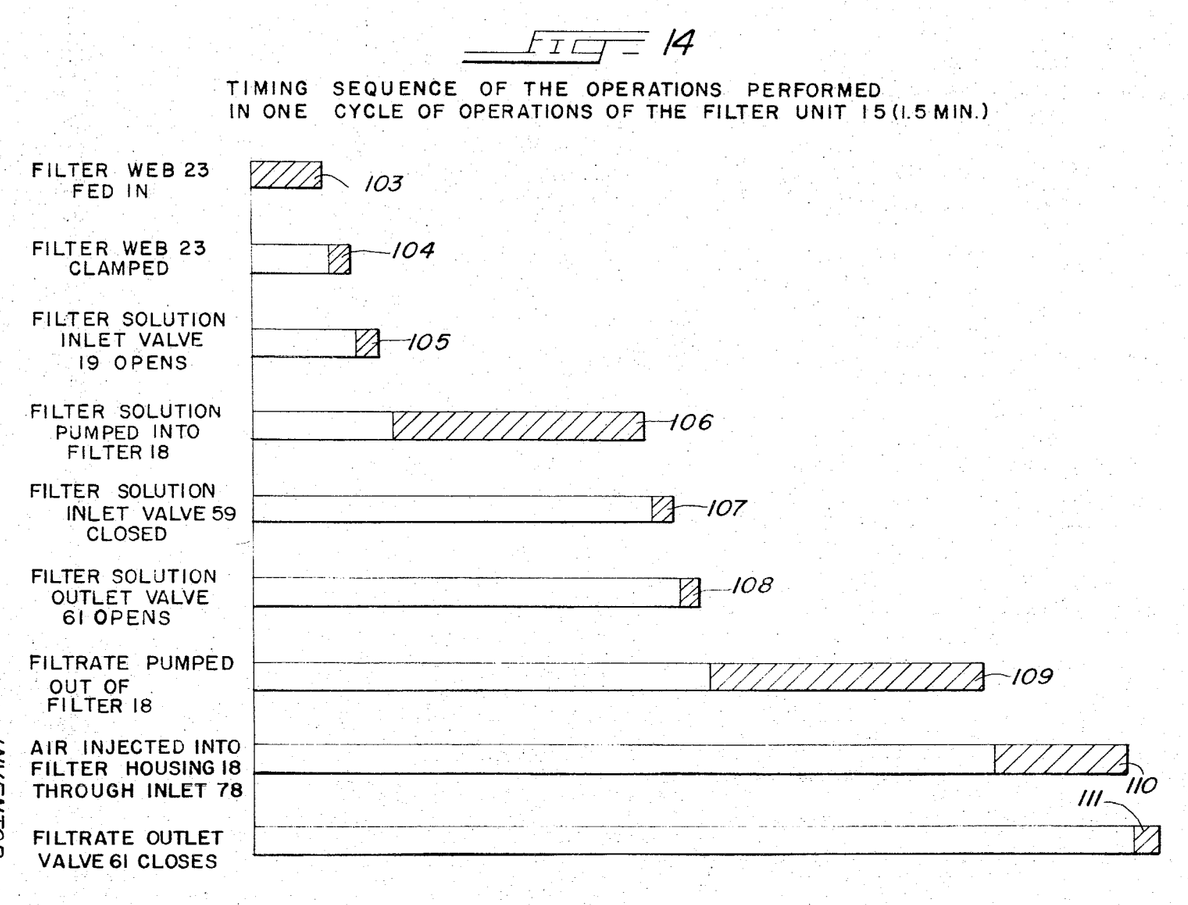
FIG. 14 is a timing chart showing the time sequences of the various operations which are performed in a typical cycle of operations of the new filter apparatus.

The timing sequence of the various operations performed in one cycle of operations of the new filter apparatus 15 (approximately 1.5 minutes) is shown in FIG. 14 wherein the shaded or cross-sectioned portions 103, 104, 105, 106, 107, 108, 109, 110, 111 and 112 of the bar graphs illustrated show the sequence of the various operations and the approximate time interval required for each operation, as will now be described.

DETAILED DESCRIPTION OF OPERATION

In the following description of the operation of the new filter apparatus 15 it will be assumed that the filter apparatus 15 has not previously been used and is to undergo an initial start up, and that the parts of the new filter apparatus 15 are assembled as shown. The electrical pump-operating motor 63 is energized to operate the hydraulic pump 62, by way of the power transmission unit 64, and the timing switch unit 98 and its associated air pressure-responsive regulator switch unit 84 are energized. Likewise, the operating motor 114 for the web-advancing mechanism 48–112–113– 114–115 is energized (FIGS. 1 and 4), and the pistons 50—50-50a—50a and the attached closure, sealing and web-clamping piston heads 51—51-51a—51a are initially disposed in retracted position so as to open the web inlet 27–41 and the web outlet 29–41a. The web-advancing mechanism 48 then acts to advance the web 23 of filter sheet material from the web supply roll 22, through the web inlet opening 27–41, through the filter housing 18, and through the web outlet opening 29–41a, a sufficient lineal distance to position the fluid-resistant sealing areas or sections 47 of the filter web 23–45 over and above the lower sealing and clamping rib portions 42 and 42a of the flexible, resilient stationary, closure, sealing and clamping plate members 37 and 37a, respectively (Graph 103, FIG. 14). The electrical timer switch 98 then acts, in conjunction with the air pressure-responsive regulator switch unit 84, and the electrical conductor lines 87 and 90, to energize the valve-operating solenoids 88 and 91, thereby opening the air control valves 76 and 77, respectively, for the air cylinders 52a—52a–52—52 and thus supplying air under pressure from the air compressor 84, by way of the air lines 67–68–69–70–71–72 to the upper areas of the air cylinders 52a—52a–52—52, and thus forcing the pistons 50a—50a–50—50 and their attached combination closure, sealing and clamping piston heads 51a—51a–51—51 downwardly into engagement with the outwardly projecting rib portions 42a—42b$–42—42 of the flexible, resilient combination closure, sealing and web-clamping plate members 37 and 37a, respectively. During this operation the combination closure, sealing and clamping piston heads 51 and 51a engage the lowermost portions of the combination closure, sealing and clamping ribs 42 and 42a with the transversely extending fluid-resistant areas or sections 47 of the filter web 23 disposed and clamped between the combination closure, sealing and clamping piston heads 51 and 51a and the lowermost portions of the combination closure, sealing and clamping ribs 42 and 42a on the flexible, resilient stationary combination closure, sealing and clamping plate members 37 and 37a, respectively. At the same time, the engagement of the movable combination closure, sealing and clamping piston heads 51 and 51a with the lowermost portions of the combination closure, sealing and clamping ribs 42—42 and 42a—42a on the combination flexible, resilient closure, sealing and clamping plate members 37 and 37a closes and seals the web inlet 27–41 and the web outlet 29–41a in the filter housing 18 (Graph 104, FIG. 14).

The timing switch unit 98 then acts, by way of the electrical conductor line 94 (FIG. 5), to energize the operating solenoid 95 for the control valve 59 for the filter solution inlet 19 to the filter housing 18, thereby opening the control valve 59 so as to open the filter solution inlet opening 19 in the filter housing 18 while, at the same time, the timing switch unit 98 acts, by way of the electrical conductor line 96, to energize the operating solenoid 97 for the control valve 61 for the filtrate outlet 20 in the filter housing 18, thereby opening the control valve 61 for the filtrate outlet opening 20 in the filter housing 18 (Graph 105, FIG. 14). The filter solution is then pumped by the hydraulic pump 62 from the filter solution tank or reservoir 57, by way of the line 58 and the valve 59 and the inlet opening 19 into the filter housing 18 (Graph 106, FIG. 14), through the filter sheet material 23 and the perforated filter plate member 32–34, into the flow channel 33 and thence by way of the filtrate outlet opening 20, valve 61, pump 62 and return line 60 to the filter solution tank or reservoir 57 to filter from the filter solution any burden or residue accumulated therein as a result of the use of the filter solution for metal plating or other purposes, whereupon the filtrate is returned to the filter solution tank or reservoir by way of the valve 61, pump 62 and return line 60 (FIG. 12). The timing switch unit 98 then acts, by way of the electrical conductor line 94, to energize the operating solenoid 85 for the control valve 59 for the filter inlet opening 19 and to close the filter opening 19 (Graph 107, FIG. 14).

The timing switch unit 98 then acts, by way of the electrical conductor line 96, to energize the operating solenoid 97 for the control valve 61 for the filtrate outlet 20 of the filter housing 18, to close the control valve 61, therefor, while, at the same time, the timing switch unit 98 acts, by way of the electrical conductor 95 to energize the operating solenoid 95 for the inlet control valve 51 for the filter solution inlet 19 to the filter housing 18, thereby closing the inlet 19. Air under pressure is supplied from the air compressor 66, by way of the line 85, the air pressure-responsive regulator switch unit 84, and the air line 78, to the air inlet 122 in the top wall 24 of the filter housing 118 (FIGS. 1 and 12) to build up a suitable air pressure preferably in the order of 30 pounds per square inch in the filter housing 18.

The air pressure thus built up in the filter housing 18, after substantially all of the filter solution (and filtrate) has been withdrawn therefrom, not only effectively cleans the filter housing 18 but also tends to remove excess filter solution from the used section of the web 23 of filter sheet material prior to the used section of filter sheet material being withdrawn from the filter housing 18 by way of the web outlet opening 29–41a, thereby facilitating the cutting of the used section of the web of filter sheet material therefrom.

With the inlet opening 19 in the filter housing 18 and its control valve 59 remaining closed, and with the filtrate outlet 20 and its control valve 61 then closed, the timing switch unit 98 then acts, by way of the electrical conductor 96, to energize the operating solenoid 97 for the control valve 61, whereupon any residue of filter solution or filtrate in the filter housing 18 is blown by the air pressure built up therein out of the filter outlet 20 and is returned by way of the valve 61, line 60 and pump 62 to the filter solution tank or reservoir 57 (Graph 112, FIG. 14).

The timing switch unit 98, the air pressure-responsive regulator switch unit 86, and associated parts in the air system or circuit 65 (FIG. 13) then coact to move the pistons 50—50-50a—50a and attached combination closure, sealing and web-clamping heads 51- —51-51a—51a into open position, away from the web of filter sheet material 23, so as to open the web inlet opening 27–41 and the web outlet opening 29–41a. The timing switch unit 98 then acts to energize the operating motor 114 for the web-advancing mechanism 48 which then acts to withdraw the used section of the web 23 of filter sheet material, and the burden or residue carried thereby, out of the filter housing 18 by way of the web outlet opening 41a–29. The used section of the web 23 of filter material may then be cut manually or otherwise from the web 23 and discharged into the waste receptacle 49, whereupon the cycle of operations thus described may be repeated.

It will be noted that the recesses 44 and 44a in the stationary flexible, resilient combination closure, sealing and web-clamping plate members 37 and 37a enhance the flexibility and resiliency of the surrounding ribs 42 and 42a when the latter are subjected to pressure by the piston heads 51 and 51a.

It will thus be seen from the foregoing description, considered in conjunction with the accompanying drawings, that the present invention provides a new and improved filter apparatus having the desired advantages and characteristics and accomplishing its intended objects including those hereinbefore pointed out and others which are inherent in the invention.

I claim:

1. A filter apparatus comprising
   a. a filter housing having
      1. a filter solution inlet;
      2. a filtrate outlet;
      3. a filter web inlet for a web of flexible filter sheet material;
   b. means for circulating a filter solution into the said filter housing through the said filter solution inlet therefor and through the said filter housing and for withdrawing the filtrate from the said filter housing through the filtrate outlet;
   c. web-advancing means for cyclically advancing the said web of flexible filter sheet material into and through the said filter web inlet and between the said filter solution inlet and the said filtrate outlet and thence out of the said filter housing through the said filter web outlet;
   d. first means for cyclically closing and sealing the said filter web inlet and for clamping the said web of flexible filter sheet material in the said filter web inlet;
   e. second means for cyclically closing and sealing the said filter web outlet in the said filter housing and for clamping the said web of flexible filter sheet material in the said filter web outlet;
   f. means for cyclically opening and closing the said filter solution inlet into the said filter housing;
   g. means for cyclically opening and closing the said filtrate outlet from the said filter housing;
   h. the said first means for cyclically closing and sealing the said filter web inlet and for clamping the said web of flexible filter sheet material in the said filter web inlet including
      1. a flexible, resilient, stationary member mounted on the said filter housing at the said filter web inlet and having an auxiliary filter web inlet therein in registry with the said filter web inlet in the said filter housing for the passage of the said web of flexible filter sheet material;
      2. a movable pressure-applying member adapted to be moved into engagement with the said flexible, resilient, stationary member to close and seal the said first-named filter web inlet in the said filter housing and the said auxiliary web inlet and to clamp the said web of flexible, filter sheet material between the said stationary member and the said movable member; and
   i. means for cyclically applying fluid pressure to the said movable pressure-applying member so as to move the same into engagement with the said flexible, resilient stationary member to close and seal the said first-named web inlet and the said auxiliary web inlet and to clamp the said web of flexible filter sheet material therein.

2. A filter apparatus as defined in claim 1 in which
   a. the said flexible, resilient, stationary member includes
      1. an elongated flexible, resilient body attached to the said filter housing; and in which
      2. the said auxiliary filter web inlet is in the form of an elongated generally rectangular-shaped filter web inlet formed in the said flexible, resilient body and adapted to be cyclically closed and sealed by engagement of the said movable pressure-applying member with the said flexible, resilient body of the said stationary member.

3. A filter apparatus as defined in claim 2 in which
   a. the said, flexible, resilient body of the said stationary member includes
      1. an inner surface facing toward the said filter housing and toward the said movable pressure-applying member; and in which the auxiliary web inlet in the said stationary member has
      2. marginal edge portions surrounding the said auxiliary web inlet; and in which the said flexible, resilient body of the stationary member includes
      3. a raised, flexible resilient rib surrounding the said marginal edge of the said generally rectangular-shaped auxiliary web inlet and projecting toward the said filter housing and toward the said movable pressure-applying member outwardly of the said inner surface of the said flexible, resilient body and adapted to be engaged by the said movable pressure-applying member so as to close and seal the said first filter web inlet in the said filter housing and to close and seal the said auxiliary filter web inlet and to clamp the said web of flexible material in the said filter web inlet.

4. A filter apparatus as defined in claim 1 which includes
   a. a web of flexible filter sheet material; and in which the said web of flexible filter sheet material includes
      1. an elongated generally rectangular-shaped flexible filter sheet body having
         a. generally parallel marginal edge portions; and in which
      2. the said web of flexible filter sheet material has
         a. areas of fluid-resistant material arranged thereon at spaced intervals longitudinally of the said elongated flexible sheet body and extending between the said marginal edge portions thereof; and in which
      3. the said sections of fluid-resistant material are spaced at intervals longitudinally of the said flexible sheet body corresponding to the spacing of the said first and second means so that when the said first and second means are moved into operative position they will seal and clampingly engage the said sections of fluid-resistant material on the said flexible filter sheet body of the said web of flexible filter sheet material.

5. Filter apparatus as defined in claim 4 in which
   a. the said elongated generally rectangular-shaped flexible body of filter sheet material has
      1. longitudinally extending marginal edges extending generally parallel to the longitudinal axis of the rectangular-shaped elongated body of filter sheet material; and in which
   b. the said areas of fluid-resistant material are arranged at spaced intervals and extend transversely between the said longitudinal edges of the said elongated body of filter sheet material; and in which
   c. the said spaced sections of fluid-resistant material are spaced longitudinally of the said elongated body of the said flexible filter sheet material a distance corresponding to the spacing of the said flexible, resilient stationary member so that when the said first means and the said second means are moved into operative position they will engage the said sections of fluid-resistant material on the said elongated flexible body of the said filter sheet material.

6. A filter apparatus comprising
a. a filter housing having
   1. a filter solution inlet;
   2. a filtrate outlet;
   3. a filter web inlet for a web of flexible filter sheet material; and
   4. a filter web outlet for the web of flexible filter sheet material;
b. means for circulating a filter solution into the said filter housing through the said filter solution inlet therefor and through the said filter housing and for withdrawing the filtrate from the said filter housing through the said filtrate outlet;
c. web-advancing means for cyclically advancing the said web of flexible filter sheet material into and through the said filter web inlet and between the said filter solution inlet and the said filtrate outlet and thence out of the said filter housing through the said filter web outlet;
d. first means for cyclically closing and sealing the said filter web inlet and for clamping the said web of flexible filter sheet material in the said filter web inlet;
e. second means for cyclically closing and sealing the said filter web outlet in the said filter housing and for clamping the said web of flexible filter sheet material in the said filter web outlet;
f. means for cyclically opening and closing the said filtrate outlet from the said filter housing; the said second means including
   1. a flexible, resilient stationary member mounted on the said filter housing at the said filter web outlet and having
      a. an auxiliary generally rectangular-shaped filter web outlet therein in registry with the said first-named filter web outlet in the said filter housing for the passage of the said web of flexible filter sheet material; and the said flexible, resilient stationary member having
      b. a marginal edge portion surrounding the said auxiliary generally rectangular-shaped filter web outlet;
   2. a movable pressure-applying member adapted to be moved into engagement with the said flexible, resilient, stationary member to close and seal the said first-named filter web outlet in the said filter housing and to close and seal the said auxiliary filter web outlet and to clamp the said web of flexible filter sheet material between the said stationary member and the said movable member;
h. means for cyclically moving the said movable pressure-applying member into engagement with the said flexible, resilient stationary member including
   1. pneumatically operated piston means; and
   2. means for supplying air under pressure to the said pneumatically operated piston means;
i. the said flexible, resilient stationary member including
   1. a body having
      a. an inner surface facing toward the said movable pressure-applying member; and
      b. a raised, flexible, resilient rib surrounding the marginal edge portion of the said auxiliary generally rectangular-shaped web outlet and projecting toward the said movable pressure-applying member and adapted to be engaged by the said movable pressure-applying member so as to close and seal the said first-named filter web outlet in the filter housing and to close and seal the said auxiliary filter web outlet and to clamp the said web of flexible filter material in the said auxiliary filter web outlet.

* * * * *